(12) United States Patent
Albrecht et al.

(10) Patent No.: US 10,107,245 B2
(45) Date of Patent: Oct. 23, 2018

(54) PLUNGER FUEL PUMP FOR AN INTERNAL COMBUSTION ENGINE

(71) Applicant: Robert Bosch GmbH, Stuttgart (DE)

(72) Inventors: Oliver Albrecht, Bietigheim-Bissingen (DE); Soeren Stritzel, Boeblingen (DE); Tobias Schenk, Schorndorf (DE); Heiko Jahn, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 15/117,902

(22) PCT Filed: Dec. 23, 2014

(86) PCT No.: PCT/EP2014/079148
§ 371 (c)(1),
(2) Date: Aug. 10, 2016

(87) PCT Pub. No.: WO2015/120944
PCT Pub. Date: Aug. 20, 2015

(65) Prior Publication Data
US 2017/0009721 A1 Jan. 12, 2017

(30) Foreign Application Priority Data
Feb. 17, 2014 (DE) .......... 10 2014 202 795

(51) Int. Cl.
*F02M 59/44* (2006.01)
*B29C 45/34* (2006.01)
(Continued)

(52) U.S. Cl.
CPC ....... *F02M 59/442* (2013.01); *B29C 45/0025* (2013.01); *B29C 45/0046* (2013.01); *B29C 45/34* (2013.01); *F02M 55/007* (2013.01); *F02M 59/025* (2013.01); *F02M 59/445* (2013.01); *F04B 19/22* (2013.01); *F04B 53/143* (2013.01); *F16J 15/3204* (2013.01);
(Continued)

(58) Field of Classification Search
CPC .................... F02M 59/442; F02M 2200/8046
See application file for complete search history.

(56) References Cited

U.S. PATENT DOCUMENTS

2015/0308394 A1* 10/2015 Flo .......... F02M 59/02
417/437
2015/0369190 A1* 12/2015 Ropertz ......... F02M 59/02
417/437

FOREIGN PATENT DOCUMENTS

DE    196 18 013 A1    11/1997
DE    103 27 408 A1    4/2004
(Continued)

OTHER PUBLICATIONS

International Search Report corresponding to PCT Application No. PCT/EP2014/079148, dated Mar. 19, 2015 (German and English language document) (7 pages).

*Primary Examiner* — Thomas E Lazo
(74) *Attorney, Agent, or Firm* — Maginot, Moore & Beck LLP

(57) ABSTRACT

A plunger fuel pump for an internal combustion engine includes a pump cylinder and a pump plunger that is axially displaceable in the pump cylinder. The plunger fuel pump has a seal with an annular basic structure arranged around the circumference of the pump plunger. The seal is produced by injection molding in an axial injection direction.

13 Claims, 5 Drawing Sheets

(51) Int. Cl.
  *B29C 45/00*     (2006.01)
  *F02M 55/00*     (2006.01)
  *F02M 59/02*     (2006.01)
  *F04B 19/22*     (2006.01)
  *F04B 53/14*     (2006.01)
  *F16J 15/3204*   (2016.01)
  *B29L 31/26*     (2006.01)
  *B29K 105/14*    (2006.01)

(52) U.S. Cl.
  CPC .. *B29C 2045/0027* (2013.01); *B29K 2105/14* (2013.01); *B29L 2031/265* (2013.01); *F02M 2200/8046* (2013.01); *F02M 2200/9015* (2013.01); *F02M 2200/9023* (2013.01)

(56) References Cited

FOREIGN PATENT DOCUMENTS

| | | |
|---|---|---|
| DE | 10 2004 013 307 A1 | 9/2005 |
| DE | 10 2004 063 074 A1 | 7/2006 |
| DE | 10 2008 043 846 A1 | 5/2010 |
| EP | 1 967 773 A1 | 3/2007 |
| EP | 2 278 195 A1 | 1/2011 |
| JP | H11-72061 A | 3/1999 |
| JP | 2002-18912 A | 1/2002 |
| JP | 2002018912 A * | 1/2002 |
| WO | 98/04853 A1 | 2/1998 |
| WO | WO 9804853 A1 * | 2/1998 ......... B29C 45/0005 |

\* cited by examiner

PLUNGER FUEL PUMP FOR AN INTERNAL COMBUSTION ENGINE

This application is a 35 U.S.C. § 371 National Stage Application of PCT/EP2014/079148, filed on Dec. 23, 2014, which claims the benefit of priority to Serial No. DE 10 2014 202 795.0, filed on Feb. 17, 2014 in Germany, the disclosures of which are incorporated herein by reference in their entireties.

BACKGROUND

The disclosure relates to a piston fuel pump in accordance with the following description.

Fuel systems of internal combustion engines are known from the marketplace, in which fuel systems the fuel is delivered from a fuel tank under high pressure by means of a mechanically driven piston fuel pump into a fuel rail and passes from there via injectors into combustion chambers of an internal combustion engine.

In the piston fuel pump which is known from DE 10 2004 063 074 A1, for example, a displaceably mounted pump piston is provided which compresses fuel in a delivery space of the piston fuel pump. The pump piston is guided in a piston bushing with a small sealing gap and such that it slides by way of a close fit. In order to support and seal via a gap seal, the piston bushing has to have a certain length and possibly absorb great transverse forces. Therefore, the piston bushing is often produced from steel. On account of high tolerance requirements, moreover, what is known as a "piston pairing" is used, that is to say each pump housing is assigned a defined piston. Furthermore, the cylinder in the pump housing has to be honed in a complicated manner. There is a requirement for a fuel piston pump which is less complicated to produce.

SUMMARY

The problem on which the present disclosure is based is solved by way of a fuel piston pump having the features described herein. Advantageous developments of the disclosure are mentioned in the following description. Moreover, further features which are important for the disclosure are found in the following description and in the drawing.

The piston fuel pump according to the disclosure has the advantage that a piston bushing and the corresponding highly accurate fit of the piston in the piston bushing are no longer absolutely necessary and therefore considerable costs can be saved. Instead, the piston fuel pump has a seal which is arranged on the circumference of the pump piston.

According to the disclosure, said seal has an annular basic structure, in particular it runs once around the pump piston in the circumferential direction. To this extent, reference can also be made in the following text to an axis of the piston, that is to say an axial direction, in order to identify an excellent direction of the seal.

The fuel piston pump is, in particular, a pump which has a pump housing, in which a working space which is delimited by the pump piston is formed. The compression of the fuel takes place, in particular, in said working space, in particular by way of an axial movement of the pump piston which reduces the size of the working space. In particular, a compression of the fuel in the working space takes place to a high pressure level, for example to from 100 bar to 600 bar.

The seal according to the disclosure is configured, in particular, between the working space and a low pressure region of the pump. The pressure in the low pressure region is lower than the high pressure level which is generated in the working space of the pump. The pressure level in the low pressure region can lie, for example, at from 3 bar to 10 bar and can be generated by way of a separate forepump.

The working space is connected, in particular, via an outlet valve to a pump outlet and is connected, in particular, via an electrically actuable inlet valve to a pump inlet. The electrically actuable inlet valve can be configured, in particular, as a quantity control valve. As an option, furthermore, a damping device for damping pulses in the low pressure region of the pump can additionally be provided between the pump inlet and the working space.

The damping device for damping pulses in the low pressure region can comprise, for example, a gas volume which is enclosed between two diaphragms: details with regard to the damping device can be configured as shown in DE10327408A1.

A further valve which is arranged between the pump outlet and the working space and is arranged in an antiparallel manner with respect to the outlet valve can be provided and can act, in particular, as a pressure limiting valve for a high pressure accumulator which can be connected to the pump.

The outlet valve and/or the inlet valve and/or the pressure limiting valve are/is preferably fixed in a stationary manner with respect to the pump housing and to this extent also in a stationary manner with respect to the pump cylinder. Fixing of said components on the pump piston is ruled out in this regard, in particular. The advantage arises that the mass of the pump piston is low and therefore the dynamics and/or ease of movement of the pump is/are improved.

In addition or as an alternative, the pump piston is preferably configured as a solid body, with the result that it can withstand the high pressures which act during the fuel injection, in particular in the case of direct gasoline injection, without deformation. A capability of flow to pass through the pump piston in the longitudinal direction is ruled out in this regard.

Further details of the arrangement of the working space, outlet valve and pressure regulating valve with respect to one another and in the pump body can be configured, for example, as shown in DE102004013307A1.

The pump cylinder can be configured in a bushing which is fixed in the pump body. As an alternative, the pump cylinder can also be provided directly in the pump body.

The pump body, the pump piston, the pump cylinder and/or all pump parts which come into contact with the fuel preferably consist only of steels and of plastics, such that there is a high resistance even to ethanol-containing fuels and/or other aggressive fuels as a result.

According to the disclosure, the seal is manufactured by means of injection molding. The injection molding process which is also called injection molding is known in principle to a person skilled in the art, in particular for manufacturing workpieces from plastic, such as from thermoplastics.

One special feature of said method consists, in particular, in that a liquefied injection molding compound is introduced into an injection mold through an injection opening or through a plurality of injection openings. Here, the air which is initially present in the injection mold escapes, in particular, via a separate venting opening or via a plurality of separate venting openings. After cooling, the manufactured workpiece solidifies and can be removed from the injection mold. In particular, the workpiece which is manufactured in this way has deviations from the desired shape in the region which lay adjacently with respect to an injection opening or a venting opening in the injection mold. To this extent, in particular, injection points and venting points can be found on workpieces, which are also called injection nipples and venting nipples. In particular, they have the form of a local, for example annular, unevenness or an annular burr; elevated geometries which can be shaped like small warts can also occur overall. Small recesses can also occur, in particular, in the region of the venting points.

The disclosure is based on the observation that, in the case of seals for piston fuel pumps, injection and venting points of this type either have to be removed in a complicated manner by way of reworking or can be disadvantageous for the sealing function and/or for the capability of the seal to be mounted and/or handled.

According to the disclosure, said problem is solved by virtue of the fact that the seal is produced by means of injection molding with an axial injection direction.

Here, in particular, at least one injection point comes to lie on an axially oriented surface of the seal and therefore outside the sealing region of the seal. Developments of the disclosure can provide that a plurality of injection points are arranged on an axially oriented surface of the seal.

In developments, a venting point or a plurality of venting points can be arranged on an axially oriented surface of the seal. It is preferred here that the venting point or the venting points is/are arranged on an axially oriented surface of the seal which lies opposite that axial surface in the axial direction, on which the injection point lies or on which the injection points lie.

With the same effects and advantages as those mentioned above, in addition or as an alternative at least one injection point and at least one venting point can be arranged offset with respect to one another in the axial direction.

In particular, in the case of the use of the piston fuel pump in the area of gasoline direct injection, the seal is exposed to high mechanical loads. Therefore, seals made from thermoplastics which are fiber-reinforced are preferred. Fibers made from glass and/or carbon are preferred. Fiber-reinforced thermoplastic materials with mean fiber lengths of at least 100 μm are preferred. It is preferred in addition or as an alternative that the fiber proportion lies in the range from 5% by weight to 30% by weight. The use of fiber-reinforced PEEK or fiber-reinforced PA is preferred, for example PEEK 150CA30 or PA66CF20.

Fiber-reinforced thermoplastic materials as a rule have anisotropic material properties depending on the fiber orientation, such as anisotropic elasticity. The seal of the piston fuel pump according to the disclosure is loaded greatly both in the axial and in the radial direction, however; to this extent, anisotropic material properties of the seal are undesired.

In the present case, anisotropic material properties of the seal in the case of the use of fiber-reinforced thermoplastic materials can be avoided by virtue of the fact that an ordered orientation of the fibers is avoided.

To this extent, a further independent disclosure consists in a piston fuel pump for an internal combustion engine having a pump cylinder and a pump piston which can be displaced axially in the pump cylinder, which piston fuel pump is distinguished by the fact that the piston fuel pump has a seal which is arranged on the circumference of the pump piston with an annular basic structure made from a fiber-reinforced thermoplastic material, in which the orientation of the fibers is unordered. Developments within the context of the features which are disclosed in the present case, in particular in the description and the drawing, are always possible.

An unordered or non-ordered orientation of the fibers in a fiber-reinforced thermoplastic material is understood to mean that there is not a significant preferential direction of the fiber orientation either globally or locally within the seal. The fiber orientation can be present, in particular, in a chaotically unordered manner.

In contrast, it is also known that, in the case of injection molding of fiber-reinforced thermoplastic materials, there is the tendency that the fibers are oriented with respect to one another locally or even globally, in accordance with the interactions of the fibers among one another and with the injection mold which occur during the flow. The avoidance of an orientation of this type is therefore a challenge, in particular, in the case of long fibers (mean length greater than 100 μm).

In the present case, it can be provided for this purpose that the at least one injection point and the at least one venting point are arranged offset with respect to one another in the circumferential direction. Pronounced thorough mixing and swirling of the liquefied injection molding material therefore occurs in the injection mold.

As an alternative or in addition, it can be provided for this purpose that a plurality of injection points are provided on an axial side of the seal, and that at least one venting point is provided on the opposite axial side of the seal between the injection points in the circumferential direction. In this way, even more improved thorough mixing of the liquefied injection molding material occurs in the injection mold.

As an alternative or in addition, it can be provided for this purpose that a plurality of venting points are provided on the opposite axial side of the seal, and that the venting points are always arranged offset in the circumferential direction with respect to the injection points, in particular centrally in the circumferential direction. In this way, thorough mixing of the liquefied injection molding material which is once again improved occurs in the injection mold.

BRIEF DESCRIPTION OF THE DRAWINGS

In the following text, examples of the present disclosure will be explained in greater detail with reference to the appended drawings, in which.

DETAILED DESCRIPTION

Figure 1:
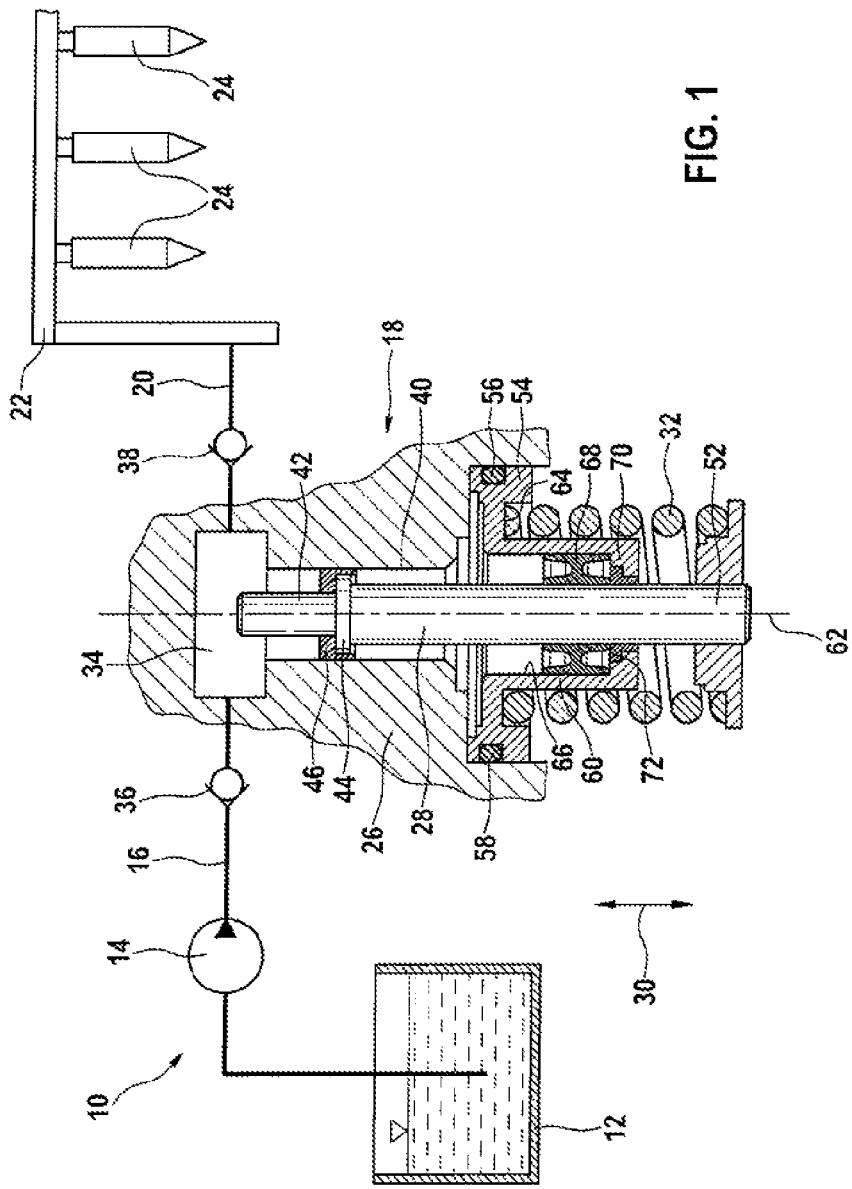
FIG. 1 shows a diagrammatic illustration of a fuel system of an internal combustion engine with a detail of a piston fuel pump according to the disclosure.

In FIG. 1, a fuel system of an internal combustion engine is given the designation 10 overall. It comprises a fuel container 12, from which an electric forepump 14 delivers the fuel into a low pressure line 16. The latter leads to a high pressure pump in the form of a piston fuel pump 18. From the latter, a high pressure line 20 leads to a fuel rail 22. A plurality of injectors 24 which inject the fuel directly into combustion chambers (not shown) which are assigned in each case to them are connected to said fuel rail 22.

The piston fuel pump 18 comprises a pump housing 26 which is indicated only in regions and in which a pump piston 28 is guided or mounted displaceably. Said pump piston 28 can be set into a to and fro movement by a cam drive (not shown), which is indicated by way of a laterally illustrated double arrow 30. The pump piston 28 is loaded by a helical spring 32 into a bottom dead center in FIG. 1. The pump piston 28 and the pump housing 26 delimit a delivery space 34. Said delivery space 34 can be connected via an inlet valve 36 to the low pressure line 16. Furthermore, the delivery space 34 can be connected via an outlet valve 38 to the high pressure line 20.

Both the inlet valve 36 and the outlet valve 38 are configured as check valves. Here, an embodiment of the inlet valve 36 as a quantity control valve is not shown but is possible. In an embodiment of this type, the inlet valve 36 can be normally open during a delivery stroke of the pump piston 28, with the result that the fuel is delivered not into the fuel rail 22, but rather back into the low pressure line 16. As a result, the fuel quantity which is delivered into the fuel rail 22 by the piston fuel pump 18 can be set.

The pump piston 28 is guided in a pump cylinder 40 which to this extent is part of the pump housing 26. At an end which faces the delivery space 34, the pump piston 28 has an upper end section 42 in FIG. 1. In the vicinity of said upper end section 42, furthermore, the pump piston 28 has a circularly annular step 44 in the manner of a radially projecting circumferential collar. A seal 46 comes into contact with the pump piston 28 or with the step 44.

At its end which faces away from the delivery space 34, furthermore, the pump piston 28 has a lower end section 52 in FIG. 1. In the vicinity of said lower end section 52, a guide sleeve 54 is arranged fixedly on the pump housing 26. An O-ring seal 56 is provided in a groove 58 between the guide sleeve 54 and the pump housing 26. The guide sleeve 54 has a cylindrical section 60 which extends coaxially with respect to the pump piston 28 and by way of which the helical spring 32 is guided. Along a piston longitudinal axis 62, the helical spring 32 dips at least in sections into a spring receiving groove 64 of the guide sleeve 54, where it is supported axially against the guide sleeve 54.

Furthermore, the guide sleeve 54 has a circularly cylindrical receiving section 66 in the interior, which receiving section 66 is formed substantially by way of the inner circumferential wall of the cylindrical section 60. An annular sealing element 68 is arranged in a stationary manner relative to the pump housing 26 in said receiving section 66, the sealing element 68 having an H-shaped cross section. Furthermore, a guide element 72 is likewise arranged in a stationary manner relative to the pump housing 26 in a collar section 70 which extends radially inward at the projecting end of the cylindrical section. Together with the seal 46, said guide element 72 which is therefore spaced apart clearly from the seal 46 as viewed in the axial direction of the pump piston 28 provides the guidance or two-point mounting of the pump piston 28.

The configuration of the region of the seal 46 and its mounting is of particular importance in the present case.

Said aspects will therefore be described in detail with reference to the following FIGS. 2-7.

Figure 2:
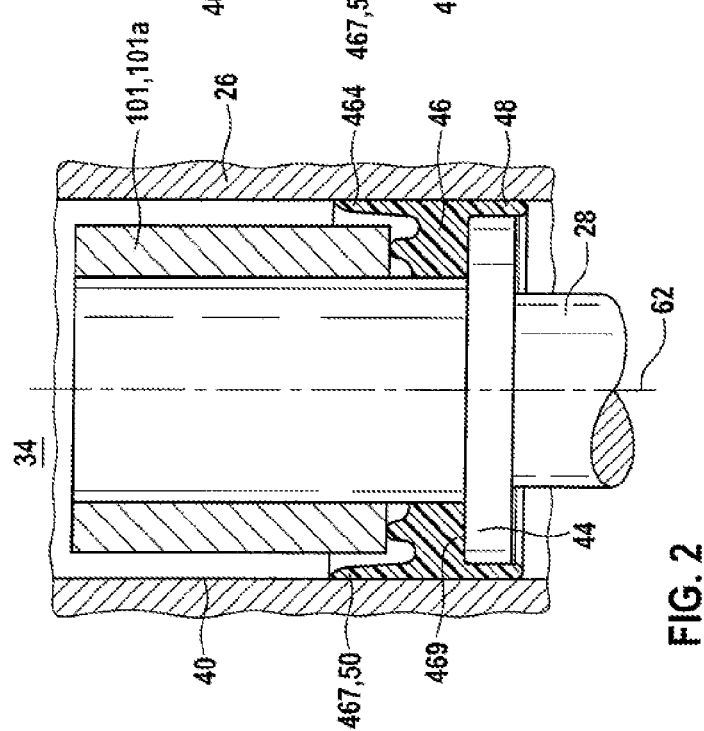
FIG. 2 shows an enlarged sectional illustration of the detail of the piston fuel pump according to FIG. 1.

FIG. 2 shows the region of the seal 46 of the piston fuel pump 18. In a lower region in FIG. 2, the seal 46 is pushed over the step 44 of the pump piston 28 to such an extent that it comes into axial contact with the step 44 on a shoulder 469 which is configured on it. In particular, that material region of the seal 46 which is present radially outside the outer circumferential face of the step 44 forms a bearing or guide region 48, by way of which the pump piston 28 is guided in a sliding manner in the pump cylinder 40 and is mounted radially.

From an inner circumferential wall of the pump cylinder 40, the guide region 48 has a spacing of approximately $^{2}/_{100}$ mm which cannot be seen in the figures. In the axial direction, that is to say along the piston longitudinal axis 62, the sealing region 50 which is configured as a sealing lip 467 extends toward the delivery space 34 in a manner which adjoins the guide region 48. Here, the sealing lip 467 extends substantially coaxially with respect to the pump piston 28 as a tubular section which is integrally formed on the guide region 48 and is prestressed elastically radially to the outside. The sealing lip 467 bears against the inner circumferential wall of the pump cylinder 40. In said example, the guide region 48 and the sealing region 50 are configured in one piece.

A cap 101 is pushed axially onto the pump piston 28, which cap 101 comes into contact with the seal 46 radially inward of the sealing lip 467 and on the working space side of the shoulder 469. The cap 101 is seated fixedly on the pump piston 28 by way of radial pressure and exerts an axially acting force on the seal 46. The seal 46 which is arranged between the cap 101 and the step 44 of the pump piston 28 is therefore under axial prestress.

In said example, the cap 101 is configured as a sleeve 101*a*, that is to say it has the form of a ring or tubular section which is open on two sides. The sleeve 101*a* is pushed completely onto the pump piston 28 and terminates flush with the latter on the working space side. As an alternative, pushing the sleeve 101*a* yet further onto the pump piston 28 or a projection on the working space side of the sleeve 101*a* would likewise also be possible in principle and possibly practicable.

Figure 3:
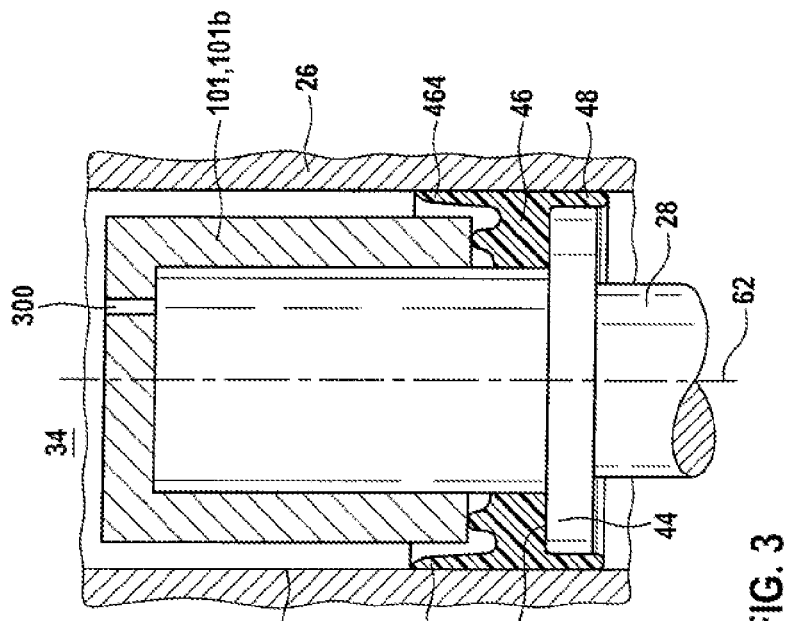
FIG. 3 shows an alternative embodiment of the piston fuel pump.

FIG. 3 shows one alternative to the configuration of the cap 101 as a sleeve 101*a*. Here, the cap is configured as a cup 101*b*. The cup 101*b* has a cup bottom and a cup wall and is pushed onto the pump piston 28 with its open end first.

In the example which is shown in FIG. 3, the cup 101*b* is pushed completely onto the pump piston 28. To this extent, its bottom comes into contact with the end side of the piston.

In said example, the cup bottom has a small hole 300 in the sectional plane of FIG. 3, through which small hole 300 air can escape from the cup when the cup 101*b* is pushed onto the pump piston 28.

In principle, in particular in the embodiments as a sleeve 101*a* or as a cup 101*b*, the cap 101 can be produced as a deep drawn part, for example made from steel. The cap 101 preferably consists of a material, the coefficient of thermal expansion of which coincides or approximately coincides with that of the pump piston 28.

For example, the cap 101 can consist of the same material as the pump piston 28. Furthermore, the cap 101 can be configured, for example, with a wall thickness of 1 mm.

In the preceding examples, the seal 46 is configured axially between the cap 101 and a step 44 which is configured in one piece on the pump piston 28. In principle, the one-piece nature is not absolutely necessary. A simplification in terms of production technology is possible by virtue of the fact that the step 44 is realized by way of a circlip which is inserted into a groove of the pump piston 28.

Figure 4:
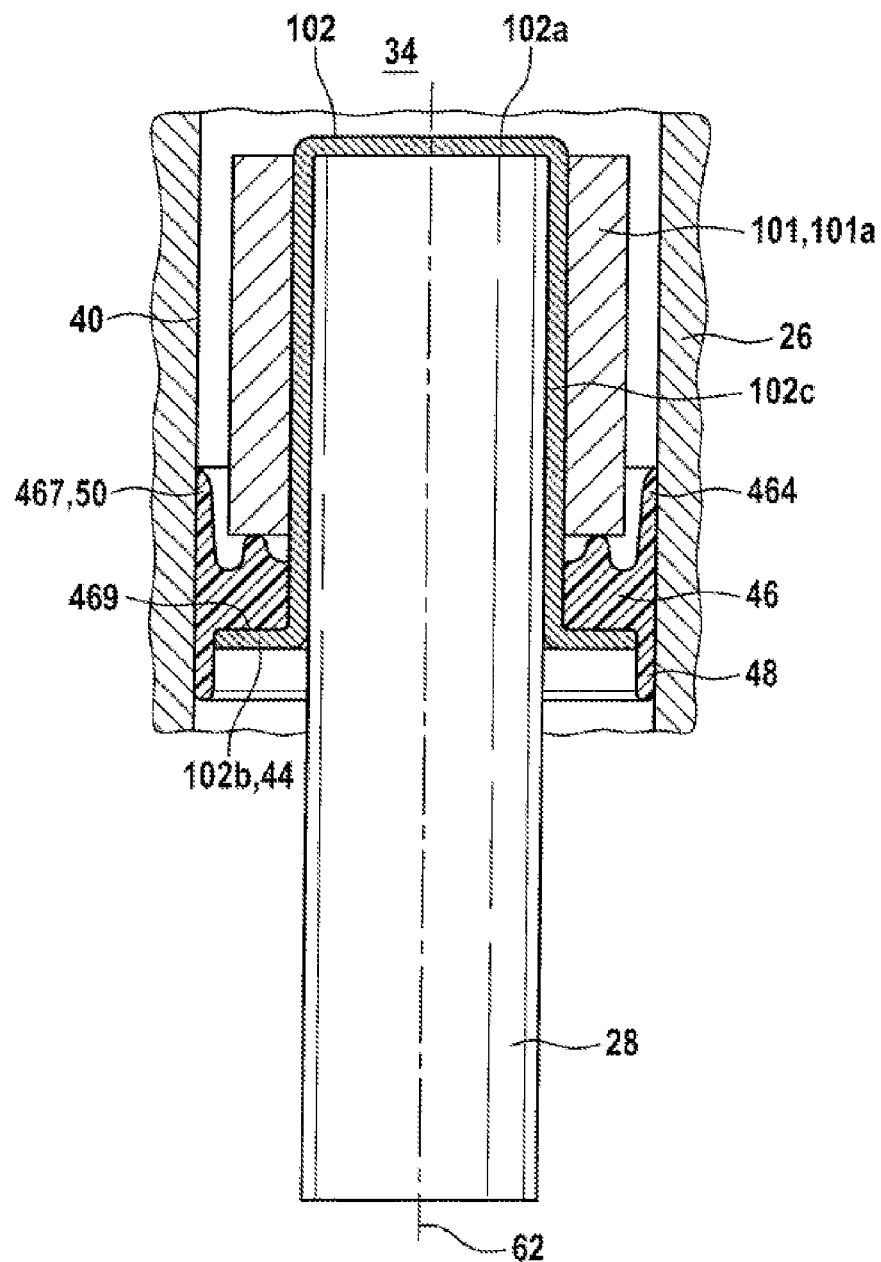
FIG. 4 shows a further alternative embodiment of the piston fuel pump.

FIG. 4 shows yet another solution in this regard. Here, a hat-shaped holding element 102 is pushed with its opening first over the working space-side end of the pump piston 28. Here, a bottom 102*a* of the holding element 102 comes axially into contact with the end side of the pump piston 28, and a side wall 102*c* of the holding element 102 comes into contact radially with the pump piston 28. A rim 102b of the holding element 102 which lies axially opposite the bottom 102a of the holding element 102 is spread radially and to this extent forms a step 44.

As in the examples which are shown in FIGS. 2 and 3, the seal 46 is in contact with the step 44 which to this extent is provided in a functionally identical manner.

In said example, the pump piston 28 has a uniform diameter along its entire length. Particularly simple and inexpensive production, for example machining of the pump piston 28 by means of throughfeed grinding, that is to say with a stationary grinding disk, is possible in this way.

It is provided in the exemplary embodiments which are shown in FIGS. 2, 3 and 4 that the seal 46 has at least one integrally formed bump 461 which points in an axial direction, and that the seal 46 bears axially via the at least one bump 461. By way of example, in said examples, the seals 46 even have in each case a plurality of bumps 461 which point in the direction of the working space 34 and via which the seal 46 bears against the cap 101 and is prestressed axially as a result. In said example, the bumps 461 have a hemispherical design. As an alternative, they might also be conical or frustoconical. The bumps 461 have, for example, a diameter of approximately 0.6 mm, approximately 10% of the diameter of the seal 46, and a height of approximately 0.3 mm, approximately 10% of the height of the seal 46.

Even if the cap 101 bears against the bumps 461 under stress, the resulting deformation of the bumps 461 is so comparatively low that bearing of the cap 101 against a region of the seal 46 which lies between the bumps 461 in the circumferential direction is suppressed.

Figure 5:
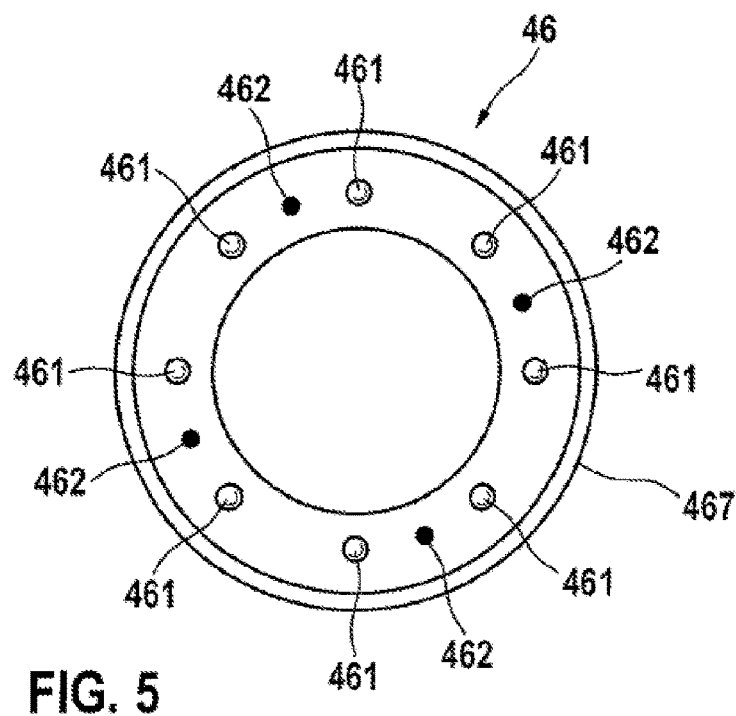
FIGS. 5 and 6 show the seal axially from above and below.
Figure 6:
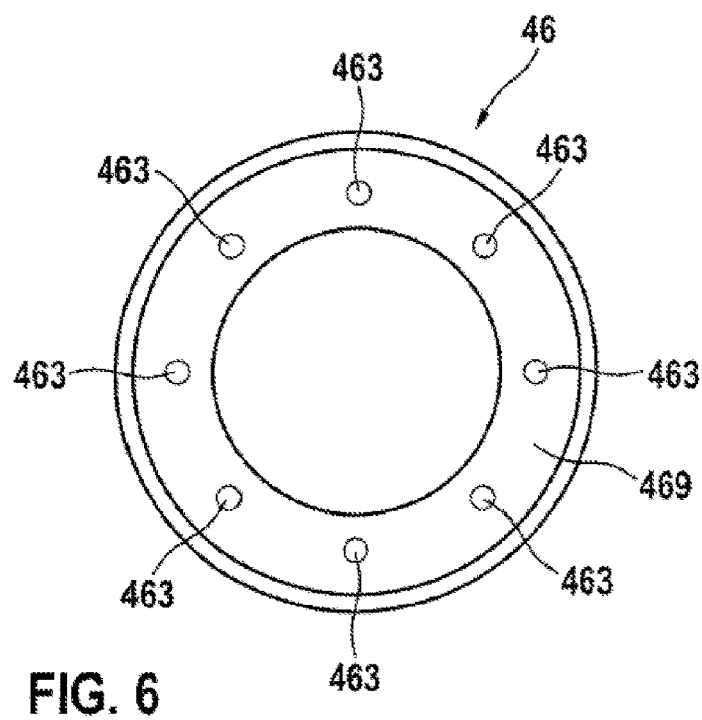

FIG. 5 shows the seal 46 in plan view, from above in relation to FIGS. 2, 3 and 4. It can be seen that a total of eight bumps 461 which are formed integrally on the seal 46 point in the direction of the working space 34, which bumps 461 are arranged on an imaginary circular ring about the piston axis 62 and are spaced apart from one another in the circumferential direction in each case by 45°.

It goes without saying that the bumps 461 might also be configured in addition or as an alternative on the axially opposite side of the seal 46, on the step 44, in an otherwise unchanged manner.

In said examples, the seal 46 consists of the fiber-reinforced thermoplastic material PEEK 150CA30 or PA66CF20 and is produced by means of injection molding. Via the injection molding technique which is explained in the following text, and in particular the arrangement of the injection points 462 and the ventilating points 463, it can be achieved that the orientation of the fibers is disordered.

Here, the injection molding takes place via injection points 462 which can be seen in FIG. 5, lie on a common imaginary circular line with the bumps 461 and are spaced apart from one another by 90° in the circumferential direction. The injection points 462 appear on the finished product, for example, as small annular or crescent-shaped burrs or as small warts. The injection points have a diameter of 0.9 mm or of not more than 0.9 mm.

Furthermore, the injection molding takes place via ventilating points 463 which are arranged on the axially opposite side of the seal 46, on the bottom in FIGS. 2, 3 and 4. They can be seen in FIG. 6. In the present case, eight ventilating points 463 are provided which lie on an imaginary circular line and are spaced apart from one another by 45° in the circumferential direction. The ventilating points 463 have a diameter of 0.7 mm or of not more than 0.7 mm and appear on the finished product, for example, as small cavities.

It can be provided that injection points 462 and ventilating points 463 are always arranged offset in the circumferential direction with respect to one another. In this way, improved thorough mixing of the liquefied injection molding material takes place in the injection mold and a directed orientation of the fibers is avoided and anisotropic material properties of the seal 46 are avoided.

Figure 7:
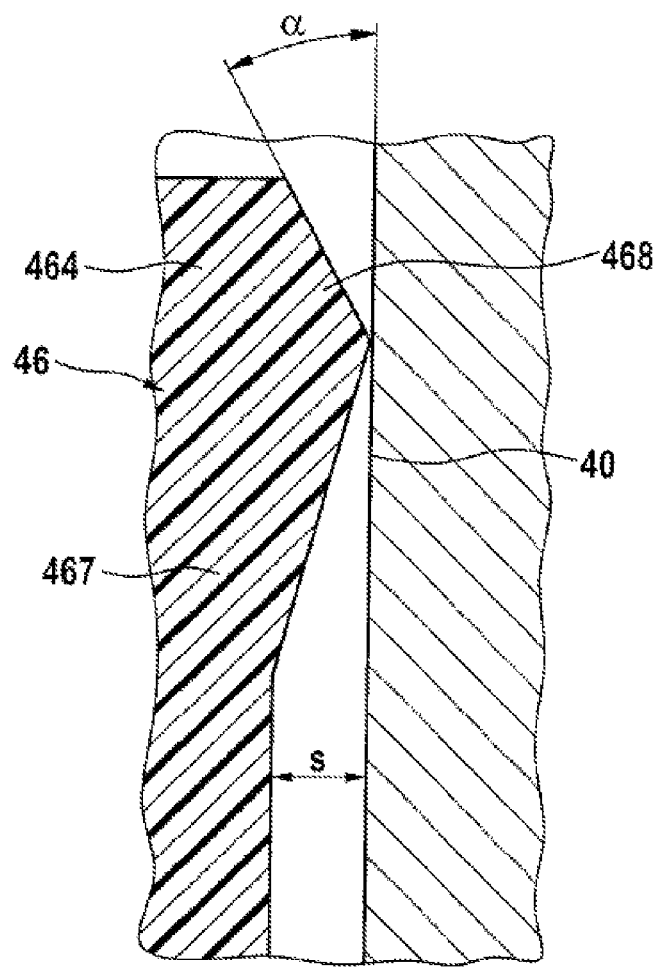
FIG. 7 shows an axial end region of the seal on an enlarged scale.

In the present case, an axial end region 464 of the seal 46 is configured on the sealing lip 467 on the working space side. FIG. 7 shows a detail of the seal 46 which is once again enlarged accordingly.

It is provided that a radially outwardly lying surface of the seal 46 which lies opposite an inner surface of the pump cylinder 40 is inclined in an axial end region 464 of the seal 46 radially inward at an angle α of from 10° to 60° with respect to the inner wall of the pump cylinder 40. This has the effect, or it is provided as an alternative, that a relative movement between the pump cylinder 40 and the pump piston 28 in the axial direction, in particular in the direction toward the working space 34, aids raising up of the seal 46 from the pump cylinder 28 in a radially inwardly pointing direction. In this case, a liquid film which consists of fuel is formed between the seal 46 and the pump cylinder 40, which liquid film considerably reduces the wear of the piston fuel pump 18 with a small leakage.

For this purpose, an outwardly pointing, circumferential web 468 is integrally formed at or on the sealing lip 467, which web 468 has approximately the shape of an isosceles triangle in the longitudinal direction in cross section, of which isosceles triangle the two opposite acute corners point in axial directions and the third obtuse corner of which bears against the pump cylinder 40 (statically). It is provided that merely said web comes into contact (statically) with the pump cylinder 40, whereas the seal 46 or the sealing lip 467 is otherwise spaced apart from the pump cylinder 40 by a gap. A width s of the gap is, for example, 20 μm. In the case of a relative movement, as depicted above, raising up of the web 468 from the pump cylinder 40 is also provided, furthermore.

The invention claimed is:

1. A piston fuel pump for an internal combustion engine, the piston fuel pump comprising:
   a pump cylinder;
   a pump piston configured to be displaced axially in the pump cylinder; and
   a seal having an annular basic structure,
   wherein the seal is arranged on a circumference of the pump piston, and
   wherein the seal is produced by injection molding with an axial injection direction.

2. The piston fuel pump as claimed in claim 1, wherein:
   the seal has at least one injection point and at least one venting point, and
   the at least one injection point and the at least one venting point are arranged offset with respect to one another in an axial direction.

3. The piston fuel pump as claimed in claim 2, wherein the at least one injection point and the at least one venting point are arranged offset with respect to one another in a circumferential direction.

4. The piston fuel pump as claimed in claim 1, wherein:
   a plurality of injection points are provided on a first axial side of the seal,
   at least one venting point is provided on a second axial side of the seal between injection points of the plurality of injection points in a circumferential direction, and the first axial side of the seal is opposite the second axial side of the seal.

5. The piston fuel pump as claimed in claim 1, wherein:
a plurality of injection points are provided on a first axial side of the seal,
a plurality of venting points are provided on a second axial side of the seal,
each venting point of the plurality of venting points is offset in a circumferential direction with respect to each injection point of the plurality of injection points, and
the first axial side of the seal is opposite the second axial side of the seal.

6. The piston fuel pump as claimed in claim 1, wherein:
a plurality of injection points are provided on a first axial side of the seal,
a plurality of venting points are provided on a second axial side of the seal,
each venting point of the plurality of venting points is arranged approximately centrally in a circumferential direction with respect to two adjacent injection points, and
the first axial side of the seal is opposite the second axial side of the seal.

7. The piston fuel pump as claimed in claim 2, wherein at least one of the at least one injection point and the at least one venting point is a locally uneven structure.

8. The piston fuel pump as claimed in claim 1, wherein the seal has a fiber-reinforced thermoplastic material.

9. The piston fuel pump as claimed in claim 8, wherein fibers in the fiber-reinforced thermoplastic material are oriented anisotropically.

10. The piston fuel pump as claimed in claim 8, wherein fibers in the fiber-reinforced thermoplastic material have a mean length of greater than or equal to 100 µm.

11. The piston fuel pump as claimed in claim 8, wherein fibers in the fiber-reinforced thermoplastic material have carbon.

12. The piston fuel pump as claimed in claim 8, wherein the seal has PEEK.

13. The piston fuel pump as claimed in claim 8, wherein fibers in the fiber-reinforced thermoplastic material consist of carbon.

* * * * *